United States Patent
Iyer et al.

(10) Patent No.: US 7,433,947 B1
(45) Date of Patent: Oct. 7, 2008

(54) SYSTEM AND METHOD FOR DETERMINING REAL-TIME APPLICATION VERB RESPONSE TIMES

(75) Inventors: Venkatesh R. Iyer, Sunnyvale, CA (US); Shilpa P. Bansod, Cupertino, CA (US); Sanjeevan P. Raghavendran, Milpitas, CA (US)

(73) Assignee: Network General Technology, George Town (KY)

( * ) Notice: Subject to any disclaimer, the term of this patent is extended or adjusted under 35 U.S.C. 154(b) by 579 days.

(21) Appl. No.: 10/039,111

(22) Filed: Jan. 4, 2002

(51) Int. Cl.
*G06F 15/173* (2006.01)
*G06F 15/16* (2006.01)

(52) U.S. Cl. .................... 709/224; 709/223; 709/232; 370/232; 370/233; 370/234; 370/252; 370/253

(58) Field of Classification Search ............... 709/224, 709/231–233, 79; 707/102; 702/79; 370/232–234, 370/252–253
See application file for complete search history.

(56) References Cited

U.S. PATENT DOCUMENTS

| | | | | |
|---|---|---|---|---|
| 5,331,574 A * | 7/1994 | Temoshenko et al. | ....... | 702/186 |
| 5,917,822 A * | 6/1999 | Lyles et al. | ............... | 370/395.4 |
| 6,144,961 A * | 11/2000 | de la Salle | .................... | 707/10 |
| 6,178,449 B1 * | 1/2001 | Forman et al. | ............... | 709/224 |
| 6,256,306 B1 * | 7/2001 | Bellenger | .................... | 370/389 |
| 6,408,001 B1 * | 6/2002 | Chuah et al. | ................. | 370/392 |
| 6,449,251 B1 * | 9/2002 | Awadallah et al. | ........... | 370/229 |
| 6,457,051 B1 * | 9/2002 | Riddle et al. | ................. | 709/224 |
| 6,473,794 B1 * | 10/2002 | Guheen et al. | ............... | 709/223 |
| 6,477,571 B1 * | 11/2002 | Ross | ........................... | 709/224 |
| 6,483,805 B1 * | 11/2002 | Davies et al. | ................ | 370/235 |
| 6,636,480 B1 * | 10/2003 | Walia et al. | .................. | 370/229 |
| 6,654,342 B1 * | 11/2003 | Dittia et al. | .................. | 370/229 |
| 6,721,334 B1 * | 4/2004 | Ketcham | ..................... | 370/473 |
| 6,839,751 B1 * | 1/2005 | Dietz et al. | .................. | 709/224 |
| 2005/0027507 A1 * | 2/2005 | Patrudu | ........................ | 704/1 |

FOREIGN PATENT DOCUMENTS

EP  1049299 A1 * 11/2000
WO  01/01272  1/2001

OTHER PUBLICATIONS

Begel, Andrew et al. "BPF+: Exploiting Global Data-Flow Optimization in a Generalized Packet Filter Architecture." Proceedings of the Conference on Applications, Technologies, Architectures, and Protocols for Computer Communication. ACM Press. 1999. pp. 123-134.*

(Continued)

*Primary Examiner*—Jason Cardone
*Assistant Examiner*—Jeffrey R Swearingen
(74) *Attorney, Agent, or Firm*—Fenwick & West LLP

(57) ABSTRACT

A system, method and computer program product are provided for calculating application verb response times. Initially, packet data is received after which the packet data is aggregated into either an existent flow, or a new flow. In use, information is collected relating to verbs associated with the flow(s). Such information relating to the verbs is then stored so that it can be used to calculate response times associated therewith.

15 Claims, 13 Drawing Sheets

OTHER PUBLICATIONS

Ravindran, K. et al. "Incorporation of Flow and QoS Control in Multicast Routing Architectures." Proceedings of the 7th International Conference on Computer Communications and Networks. IEEE Press. Oct. 12-15, 1998. pp. 312-320.*

Joo, Youngmi et al. "TCP/IP Traffic Dynamics and Network Performance: A Lesson in Workload Modeling, Flow Control, and Trace-Driven Simulations." ACM SIGCOMM Computer Communication Review. vol. 31, Issue 2. Apr. 2001. pp. 25-37. ACM Press. □□*

Bierman, Andy et al.; "Remote Monitoring MIB Extensions for Identifying Application Protocol Verbs"; http://www.ietf.org/internet-drafts/draft-ietf-rmonmib-appverbs-02.txt.

Waldbusser, Steven; "Application Performance Measurement MIB"; http://www.ietf.org/internet-drafts/draft-ietf-rmonmib-apm-mib-05.txt.

Bierman, A. et al., Internet Draft: "Remote Monitoring MIB Extensions for Identifying Application Protocol Verbs," Nov. 25, 2000, 22 pages, [online] Retrieved from the Internet<URL:http://tools.ietf.org/html/draft-ietf-rmonmib-appverbs-01>.

Bierman, A. et al., Internet Draft: "Remote Monitoring MIB Extensions for Identifying Application Protocol Verbs," Jul. 17, 2001, 23 pages [online] Retrieved from the Internet<URL: http://tools.ietf.org/html/draft-ietf-rmonmib-appverbs-02>.

Bierman, A. et al, Internet Draft: "Remote Monitoring MIB Extensions for Identifying Application Protocol Verbs," Jul. 14, 2000, 21 pages, [online] Retrieved from the Internet<URL: http://tools.ietf.org/html/draft-ietf-rmonmib-appverbs-00>.

* cited by examiner

| Root Mean Square | $RMS = \sqrt{\dfrac{\sum(X^2)}{N}}$ |
|---|---|
| Variance | $\sigma^2 = \dfrac{\sum(X-\bar{X})^2}{N} = \dfrac{(\sum X^2) - 2\bar{X}(\sum X) + N(\bar{X}^2)}{N}$ |
| Standard Deviation | $\sigma = \sqrt{\dfrac{\sum((X-\bar{X})^2)}{N}} = \sqrt{\dfrac{(\sum(X^2)) - 2\bar{X}(\sum X) + N(\bar{X}^2)}{N}}$ |
| Trending | $m = \dfrac{N\sum(IX) - (\sum I)(\sum X)}{N\sum(I^2) - (\sum I)^2}$ |

SYSTEM AND METHOD FOR DETERMINING REAL-TIME APPLICATION VERB RESPONSE TIMES

FIELD OF THE INVENTION

The present invention relates to network analysis, and more particularly to monitoring application verb-specific response times.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic, or may also be used to classify packets into flows. For example, a database can be analyzed for certain kinds of duplication. One example of a network analyzer is the SNIFFER ANALYZER™ device manufactured by NETWORK ASSOCIATES, INC™.

One common task that a network analyzer often performs is the calculation of application response times. In particular, the time between a request to a server application and the fulfillment of the request by the application is measured. Often, network analyzers have different modes of operation (i.e. real-time mode, "expert" mode, etc.) for measuring application response times.

In a real-time mode, the network analyzer measures response times based purely on a response to the aforementioned requests by way of transport level acknowledgements. Unfortunately, these acknowledgements merely provide an indication that the request has been received by the transport layer of the server and not necessarily by the application. In other words, measuring only acknowledgements for response times tends to give skewed response times because it may not reflect that the request has been fulfilled. Thus, such real-time mode fails to provide an accurate indication of a true response time of an application.

In the expert mode, response time measurements are made "post capture." In other words, the expert mode first collects network traffic information before measuring response times. Unfortunately, this does not provide real-time results, and is severely limited by many factors that make it somewhat useless during high link utilization. For example, the capture of network traffic information may become overloaded, resulting in a loss of data which, in turn, renders inaccurate calculations. Further, the expert mode is not scaleable.

In both cases, the response times are calculated on a "per-event" basis. Unfortunately, the foregoing modes do not provide any details on a "per conversation" basis, or information relating to upper layer transaction response times (i.e. application verbs, transactions, etc.).

There is thus a need for a technique of measuring response times for particular transactions or transaction types, between two network endpoints in real time. There is further a need to aggregate this collected information with minimum overhead. Still yet, there is a further need to accomplish this without capturing and storing packets for post analysis.

DISCLOSURE OF THE INVENTION

A system, method and computer program product are provided for calculating application verb response times. Initially, packet data is received after which the packet data is aggregated into either an existent flow, or a new flow. In use, information is collected relating to application verbs associated with the flow(s). Such information relating to the application verbs is then stored so that it can be used to calculate response times associated therewith.

In the context of the present description, an "application verb" may include any specific application transaction or transaction type.

In one embodiment, it may be determined whether the packet data is associated with a new flow. If the packet data is determined to be associated with a new flow, a flow may be created along with a data structure that may be used to store the aforementioned information relating to the application verbs. In use, the data structure may be inserted into the flow.

In another embodiment, the creation of the data structure may include identifying a protocol identifier associated with the flow, and determining a number of known application verbs associated with the protocol identifier. Further, memory is allocated for the data structure based on the number of known application verbs associated with the protocol identifier. Still yet, the number of application verbs associated with the protocol identifier may be determined utilizing a map. Moreover, the map may also map to a remote monitoring (RMON) protocol tree.

In still yet another embodiment, the aggregation may include updating and populating the aforementioned data structure with the information. Further, application verbs may be identified in the flows. It may also be determined whether the application verbs are valid, so that a state machine may be updated if it is determined that the application verbs are valid.

Also, it is determined whether a response associated with the flows is complete. If it is determined that the response is complete, a response time may be calculated. Further it is determined whether the state machine is in a valid state, and the state machine may be utilized as being representative of the response time if the state machine is in a valid state.

Monitoring response times for application verbs (i.e. transactions, etc.) is important because the application verbs may have varying business significance. This feature thus provides more granularity as to what exactly might be performing poorly in the network.

BRIEF DESCRIPTION OF THE DRAWINGS

FIG. 6B illustrates some exemplary formulae that may be used to calculate information that, in turn, may be used to populate the data structure.

DESCRIPTION OF THE PREFERRED EMBODIMENTS

Figure 1:
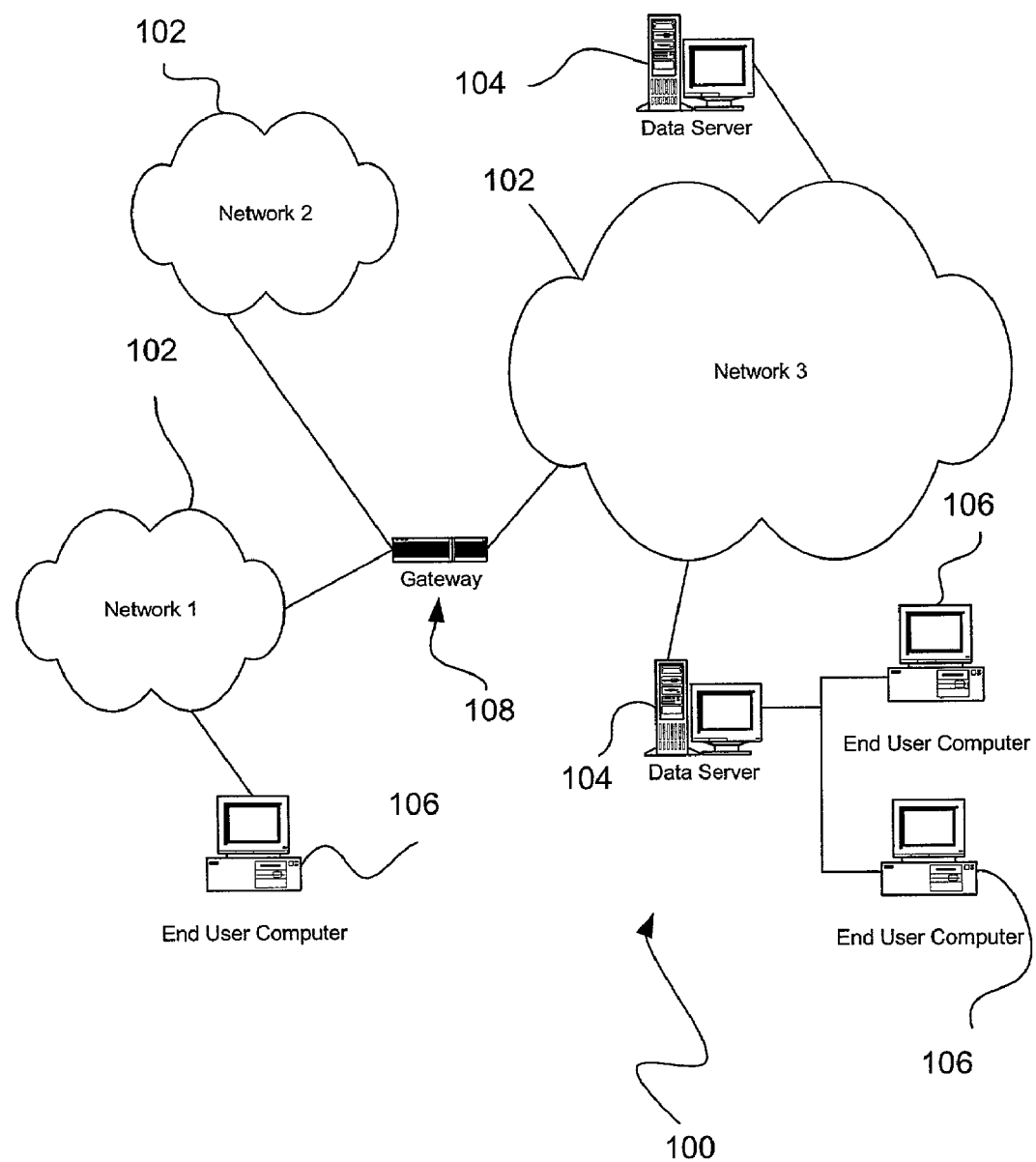
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In the context of the present description, a computer may refer to any web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Coupled to any one of the foregoing components and/or segments may be a network analyzer. One exemplary network analyzer that may be used is the SNIFFER ANALYZER™ device manufactured by NETWORK ASSOCIATES, INC™. In use, the network analyzer is adapted for monitoring and analyzing network traffic, detecting bottlenecks and problems, etc. In addition to or instead of such functionality, the network analyzer may be adapted for calculating verb-specific application response times. In one embodiment, the network analyzer may be implemented as a computer program product stored on a computer readable medium. In the context of the present description, an "application verb" may include any specific application transaction or transaction type. Examples of application verbs will be set forth later.

In use packet data is aggregated to an existent flow if one exists for the conversation that the packet data belong to, or a new flow is created in the absence of such a flow. In the context of the present description, packet data may refer to any information (i.e. fields, performance parameters, descriptors, etc.) associated with the packets and/or the packets themselves. Further, a flow may refer to any representation of communication between at least two points in a network. Next, information is collected relating to application verbs associated with the flows. Such information relating to the application verbs is then stored so that it can be used to calculate response times associated therewith. By this design, a deeper understanding of network traffic is afforded by monitoring response times associated with the application verbs.

Figure 2:
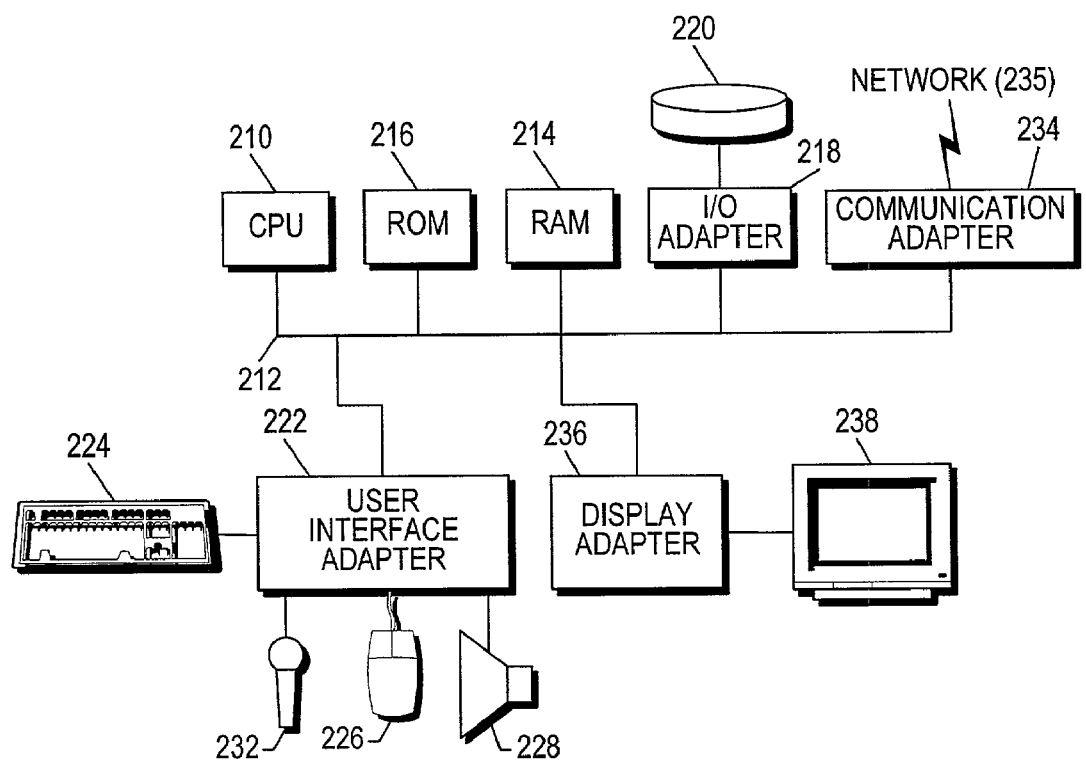
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS NT® or WINDOWS 95® Operating System (OS), the IBM OS/2® operating system, the MAC OS®, or UNIX operating system. It will be appreciated that a preferred embodiment may also be implemented on platforms and operating systems other than those mentioned. A preferred embodiment may be written using JAVA™, C, and/or C++ language, or other programming languages, along with an object oriented programming methodology. Object oriented programming (OOP) has become increasingly used to develop complex applications.

Figure 3:
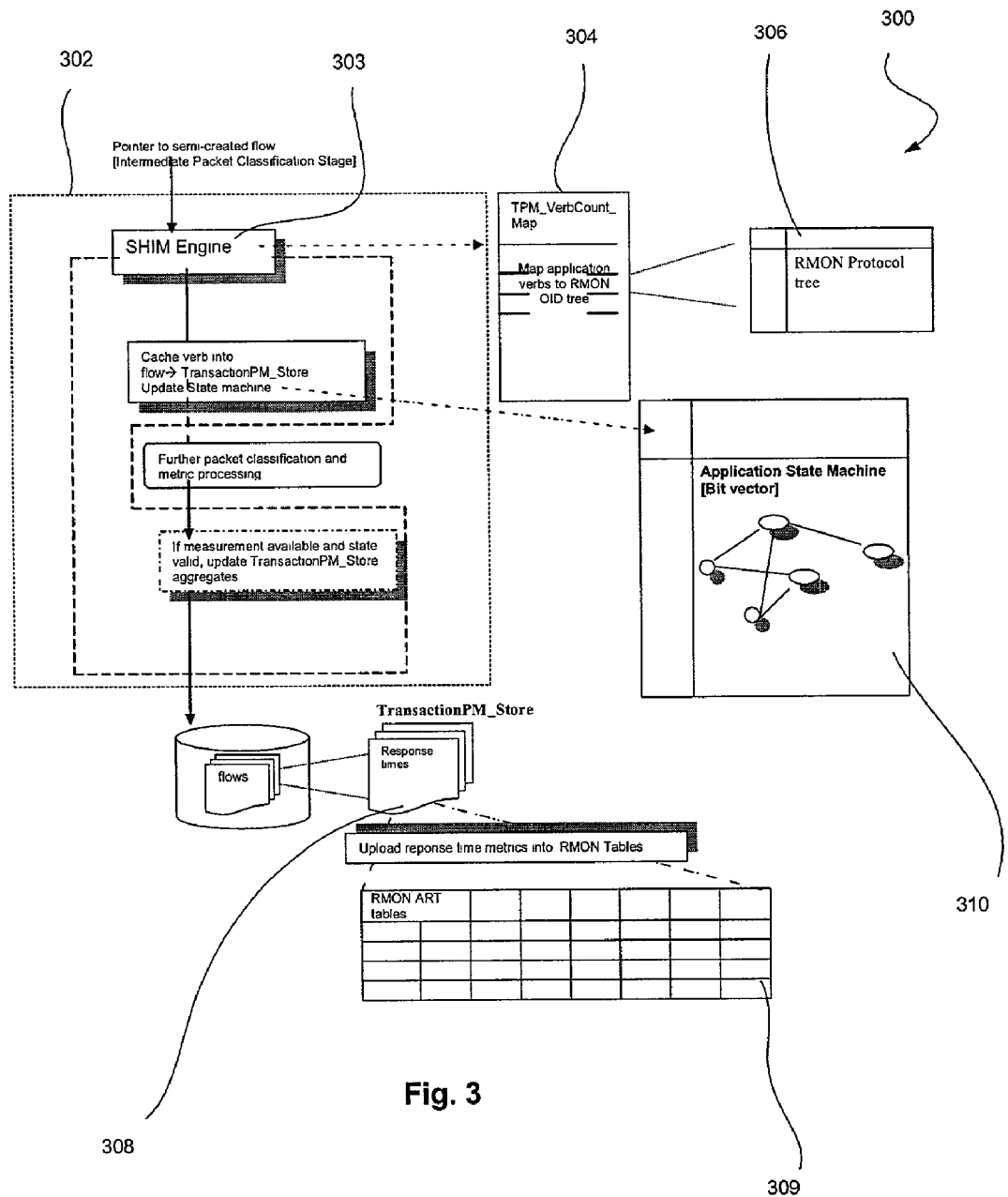
FIG. 3 illustrates an exemplary framework with which one embodiment may be carried out.

FIG. 3 illustrates an exemplary framework 300 with which the present embodiment may be carried out. As shown, provided is an engine 302, application performance monitoring (APM) module 303, verb count map 304, remote monitoring (RMON) protocol tree 306, data structure 308, and a state machine 310.

The engine 302 may include an extended 'C' code engine adapted for packet classification. As an option, the engine 302 may be deployed in an operating system kernel, so that packet classification and the verb-specific application response time calculations may be made in real-time or at near real-time. In use, the engine 302 measures application response times on a per-flow basis using packets. Further, these values may be computed after checking for retransmissions and out-of-sequence packets.

The APM module 303 is embedded in the engine 302. The state machine 310 (i.e. APM_State_Machine) may be embedded in the corresponding flow, and the code to update the state machine 310 is embedded in the engine 302 since it is part of the APM module 303. In order to do this in a spatially efficient manner, the state machine 310 may optionally be stored as a bit vector. This bit vector may be of size 32 bits, for example, and may further be stamped as a part of the flow creation by the engine 302. For reasons that will soon become apparent, the four (4) least significant bits (LSBs) of the bit vector may be used to index the last seen verb.

The remaining twenty eight (28) bits of the state machine 310 may be logically mapped to a node of the state machine 310, and represent the states that the application has gone through as the packets for the conversation are seen. To this end, the state machine 310 is designed to track the last seen verb and states that are traversed for the conversation flow. In use, the state machine 310 is updated when a packet is classified for a conversation flow.

It should be noted that the state machine 310 works on the assumption that there can be one outstanding request (verb) at any given time. However, this can be worked around if the response has sufficient information to identify the request to which it belongs.

The data structure 308 may be adapted for storing information relating to the application verbs and the state machine 310. As will soon become apparent, formulae may be used to generate such information that may be used for traffic trending, analysis and base-lining in a very efficient manner.

For example, the information stored in the data structure 308 may reflect the aggregated count of the application verbs, the min/max, the sum and sum of squares of the response times, and/or any other information capable of being used to calculate verb-specific response times. With this information available, values for various RMON Application Response Time (ART) buckets may be calculated using normal distribution formulae.

To accomplish this, the verb count map 304 and the RMON protocol tree 306 may be used to create the data structure 308 and enable RMON capabilities. More information relating to such components will be set forth hereinafter in greater detail.

The APM module 303 is capable of updating the data structure 308 with information providing insight into application verb response times. After the APM module 303 caches this information, it determines if the state machine 310 is in a valid reportable state and if the cache has a valid value. If both these conditions hold true, the data structure 308 is populated and is stored as an offshoot of the flow, at the index as given by the verb in the last valid state of the state machine 310. The data structure 308 is thus an aggregation point for verb-specific measurements. An example of such operation will be set forth hereinafter during reference to the following figures.

The APM module 303 thus "piggybacks" off of existing response time measurements and provides the ability to better diagnose problems in the network, with minimal additional code and fast computation.

As an option, a RMON abstraction layer may be provided for the addition of the application verbs to the RMON protocol tree 306. In other words, identifiers (i.e. OIDs) may be assigned to the application verbs. Assigning the identifiers to the application verbs and making them a part of the RMON protocol tree 306 gives a hierarchical structure to the performance measurements. As a part of the retrieval of the flow, the application verbs may be mapped to the RMON OIDs and then used to populate a corresponding RMON OID table 309. This allows the seamless integration of the verb specific measurements, and allows them to be aggregated in RMON tables just as any other RMON data. Any RMON probe using a similar infrastructure and technology may then be able to benefit from the present embodiment.

Figure 4:
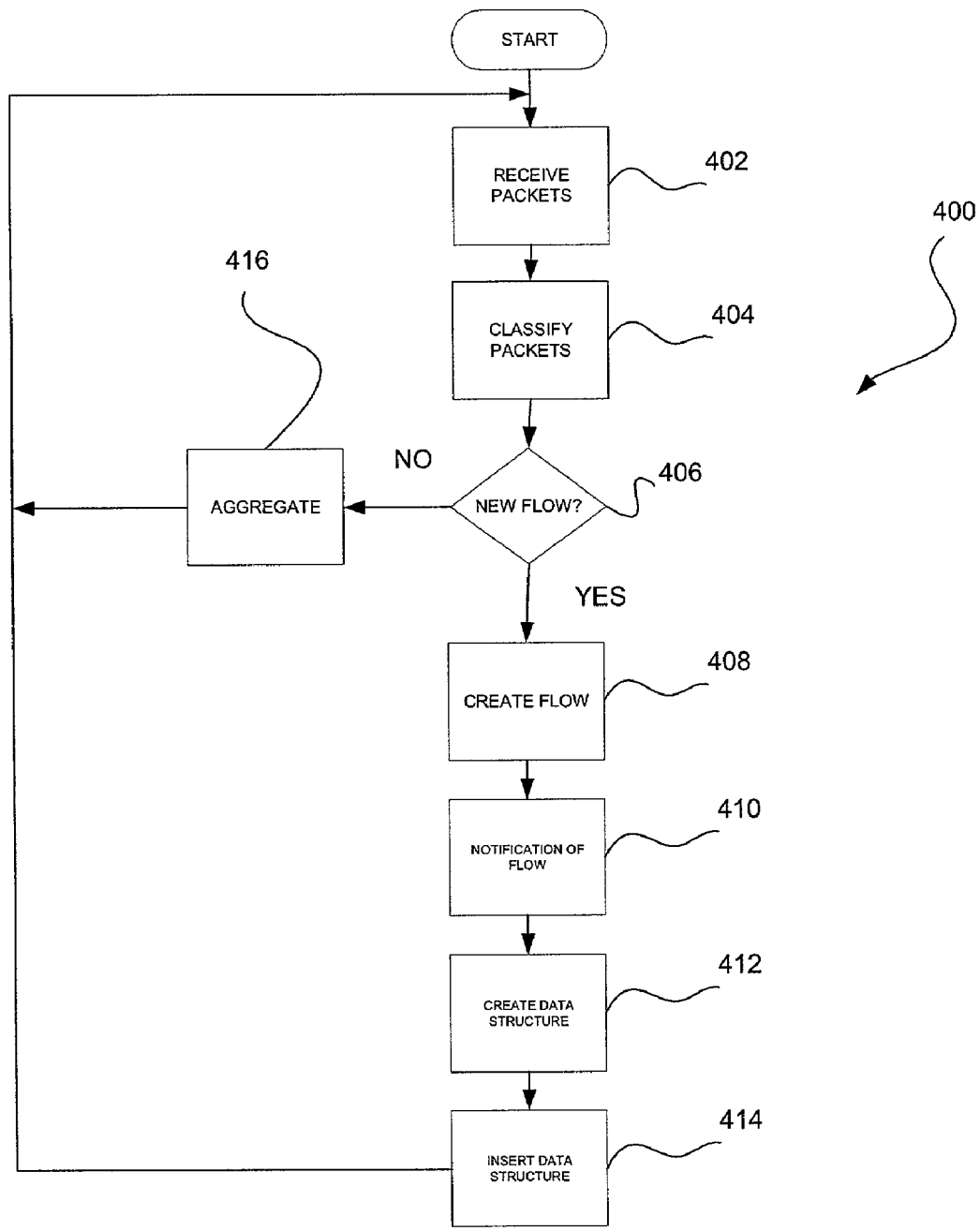
FIG. 4 illustrates a method for calculating verb-specific response times, in accordance with one embodiment.

FIG. 4 illustrates a method 400 for calculating verb-specific response times, in accordance with one embodiment. As an option, the present method 400 may be carried out in the context of the framework 300 of FIG. 3. For example, the various operations of method 400 may be carried out by the APM module 303 piggybacking on the engine 302. Of course, however, the present method 400 may also be used in any desired architectural environment.

Initially, in operation 402, packet data is received. A source of the packet data may depend on the specific component of a network the present embodiment is installed. Just by way of example, the packet data may be received from a network segment in the case where the present embodiment is installed on a router. Once received, the packet data is classified in operation 404. The packet data may be classified based on various fields (i.e. source, destination, etc.), or by any other mechanism capable of identifying a flow with which the packet data is associated.

It is then determined whether the packet data is associated with a new flow, or if the packet data is associated with an existing flow. See decision 406. If the packet data is associated with a new flow, a plurality of operations is carried out to create and monitor the new flow.

For example, the flow is initially created in operation 408 after which a notification of the flow is made in operation 410. This notification serves to prompt the creation of a data structure such as that set forth earlier during reference to FIG. 3. See operation 412. More information on an exemplary data structure and method for creating the same will be set forth during reference to FIGS. 5 and 5B.

Once the data structure has been created in operation 412, the data structure is inserted in the flow in operation 414. This allows the identification and use of the information relating to the application verbs to calculate response times. Returning to operation 406, packet data associated with existing flows may be aggregated in operation 416 using the data structure generated and inserted in the foregoing operations. More information on such aggregation will be set forth in greater detail during reference to FIG. 6A.

Figure 5A:
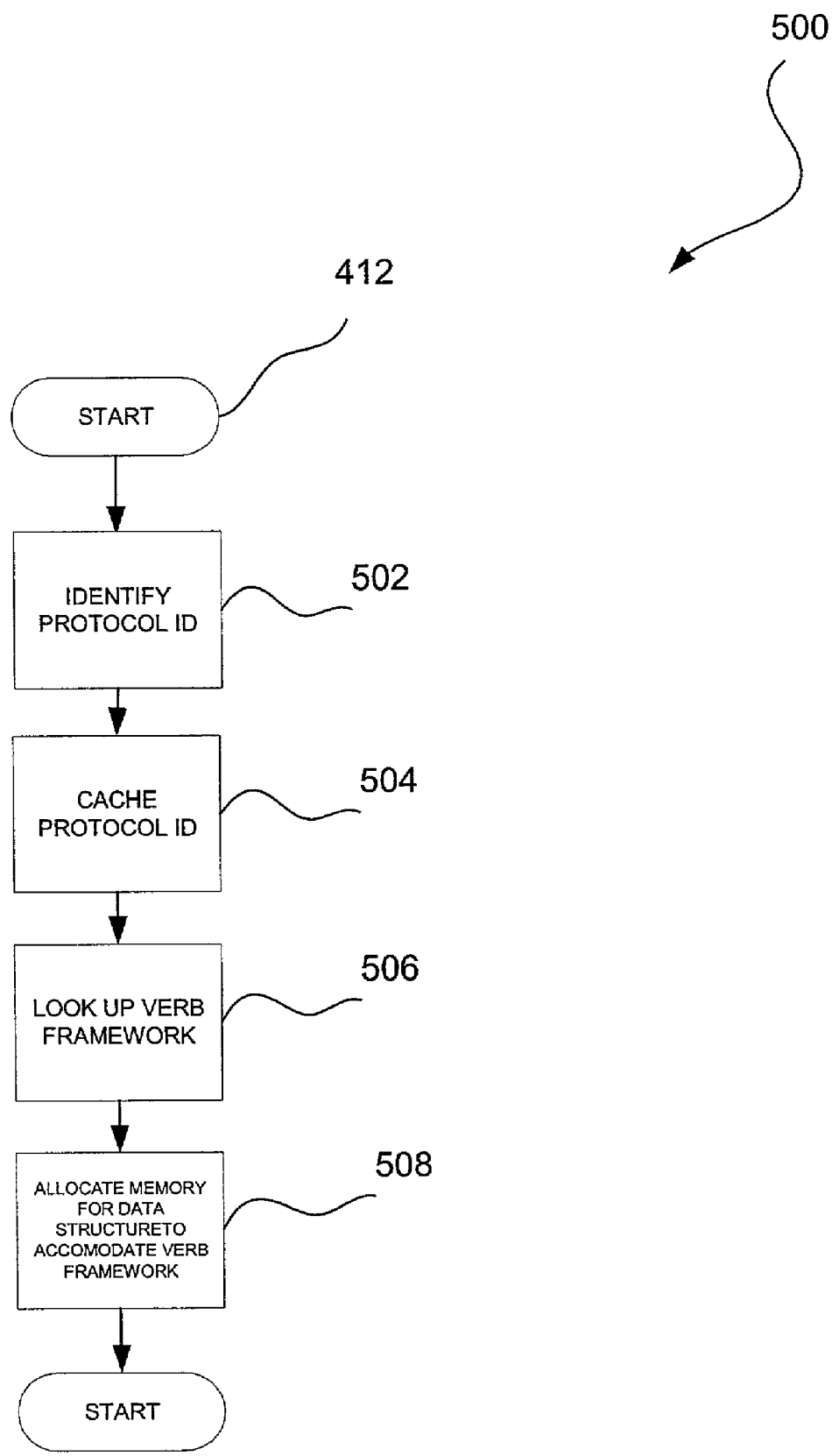
FIG. 5A illustrates a method for creating a data structure in accordance with operation 412 of FIG. 4.

FIG. 5A illustrates a method 500 for creating a data structure in accordance with operation 412 of FIG. 4. In operation 502, a protocol identifier associated with the flow is identified. Such protocol identifier may include any identifier capable of distinguishing and identifying a particular protocol [i.e. Oracle, hypertext protocol (HTTP), file transfer protocol (FTP), etc.].

Next, in operation 504, the protocol identifier is cached so that it can be used to determine a number of application verbs associated with the protocol identifier. Note operation 506. This may be accomplished utilizing a verb count map. See, for example, the verb count map 304 in FIG. 3. Such verb count map includes a number of known application verbs known to exist for each protocol associated with the protocol identifiers. Thus, such number may be looked up using the protocol identifier.

For reasons that will soon become apparent, the verb count map 304 further maps the application verbs to a RMON protocol tree (i.e. see tree 306 of FIG. 3). Next, in operation 508, memory is allocated for the data structure based on the number of known application verbs associated with the protocol identifier.

Figure 5B:
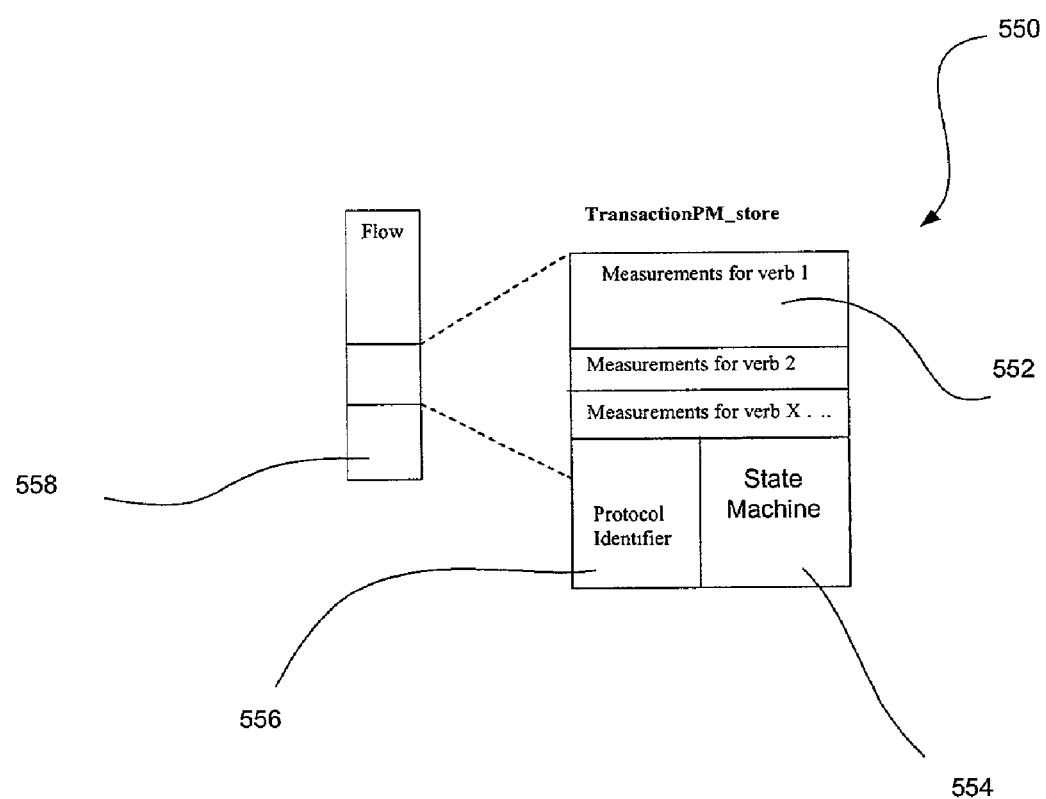
FIG. 5B illustrates a sample data structure including a plurality of verb portions allocated for a number of application verbs determined in operation 506 of FIG. 5A.

FIG. 5B illustrates a sample data structure 550 including a plurality of verb portions 552 allocated for a number of application verbs determined in operation 506 of FIG. 5A. Also included is a state machine portion 554 for storing the contents of the state machine that is used during the aggregation operation 416 of FIG. 4 in a manner that will soon become apparent. As an option, a protocol identifier portion 556 may be provided for tracking any child protocols. Once created, the data structure may be inserted in an associated flow 558, as indicated earlier in operation 414 of FIG. 4.

Figure 6A:
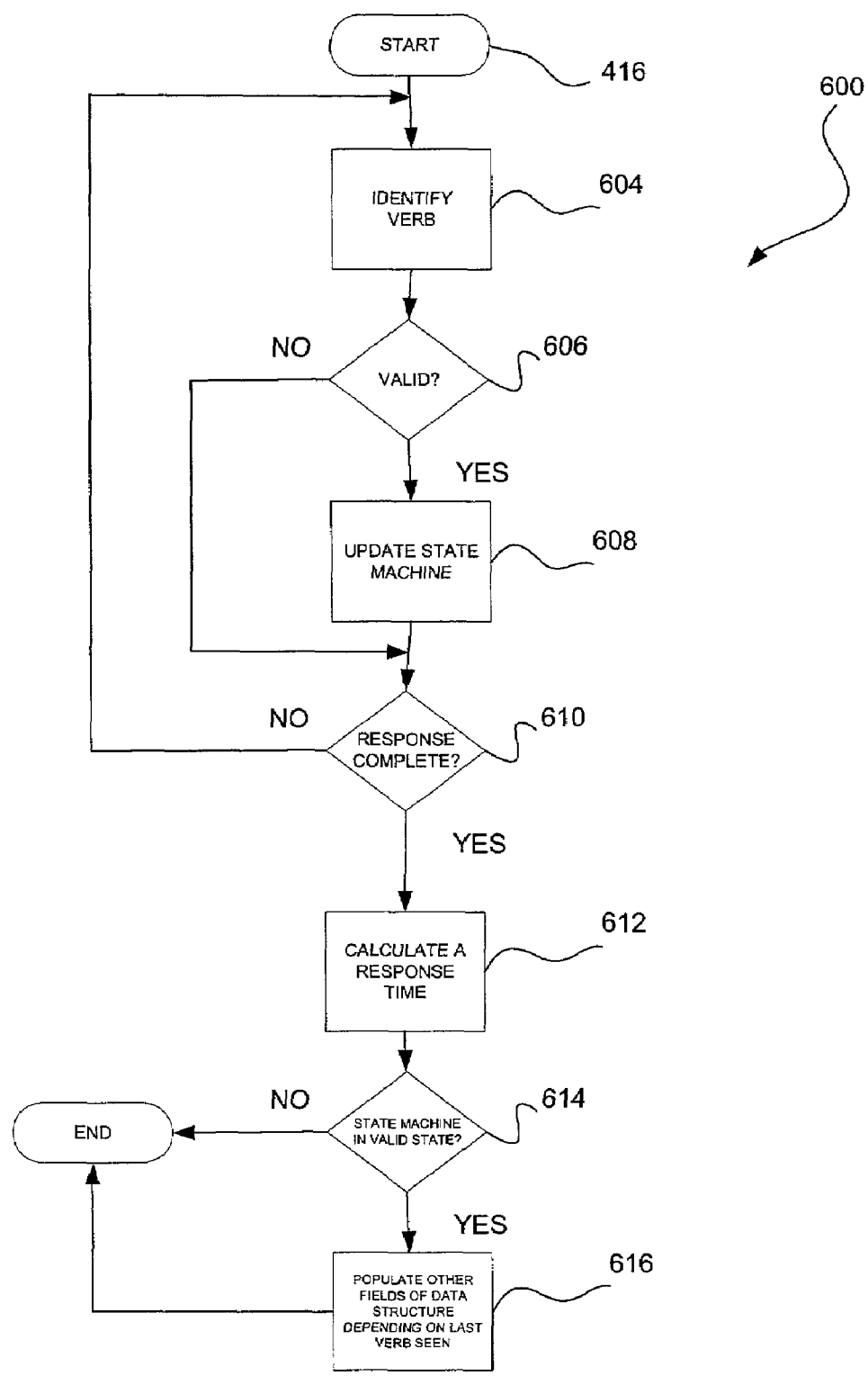
FIG. 6A illustrates a method of aggregating packet data, in accordance with operation 416 of FIG. 4.

FIG. 6A illustrates a method 600 of aggregating packet data, in accordance with operation 416 of FIG. 4. Initially, in operation 604, a verb associated with the current existing flow is identified.

It is then determined whether the verb is valid in decision 606. A verb is valid based on predetermined criteria. For example, an acknowledgement (ACK) may not be a valid verb, while a GET request may be considered valid. In general, the criteria may be such that the only verbs that are monitored are those for which response times are desired.

If the verb is valid (i.e. a known application verb), the state machine is updated in operation 608. It is then determined in operation 610 as to whether the response is complete. This may be accomplished by using the state machine associated with the data structure. If the response is not complete, the method 600 continues in operation 604. If it is complete, however, a response time is calculated in operation 612 using the information in the data structure (this may be done by the engine or any other mechanism being deployed).

Subsequently, it is determined whether the state machine is in a valid state in decision 614. It should be noted that the state machine takes into account various errors, complications, network mishaps, etc. that leave the state machine in a detectable invalid end state. Thus, only if the state machine is in a valid state, is it utilized as being representative of the response time. See operation 616.

The measured response time is then used to update the data structure. This may be accomplished by collecting information associated with the verb and inserting the same in the data structure. For example, various formulae may be used. FIG. 6B illustrates some exemplary formulae 650 that may be used to calculate information that, in turn, may be used to populate the data structure. Of course, any desired information may be used which is capable of facilitating the calculation of verb-specific application response times.

Figure 11:
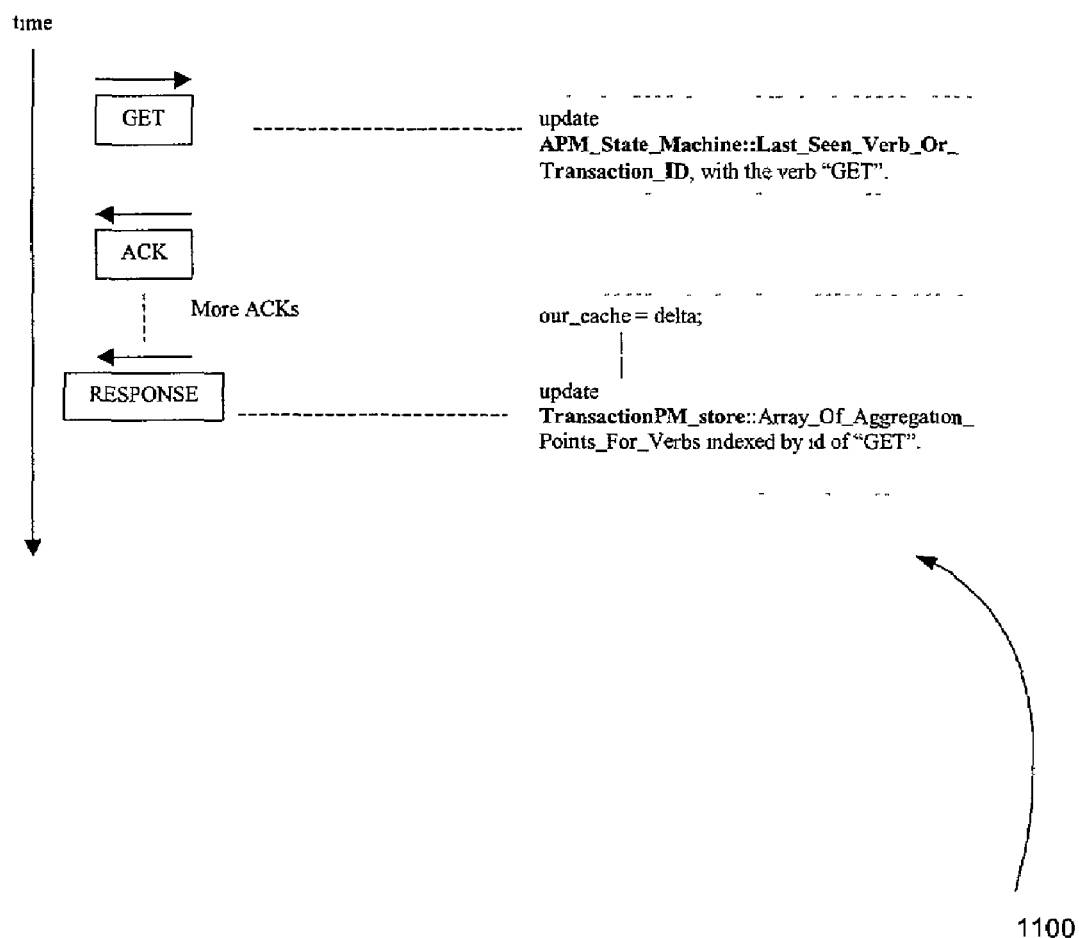
FIG. 11 illustrates a timeline of events carried out by the pseudocode of Appendix A.

More information relating to an example of such operation will be set forth during reference to Appendix A and FIG. 11.

Figure 7:
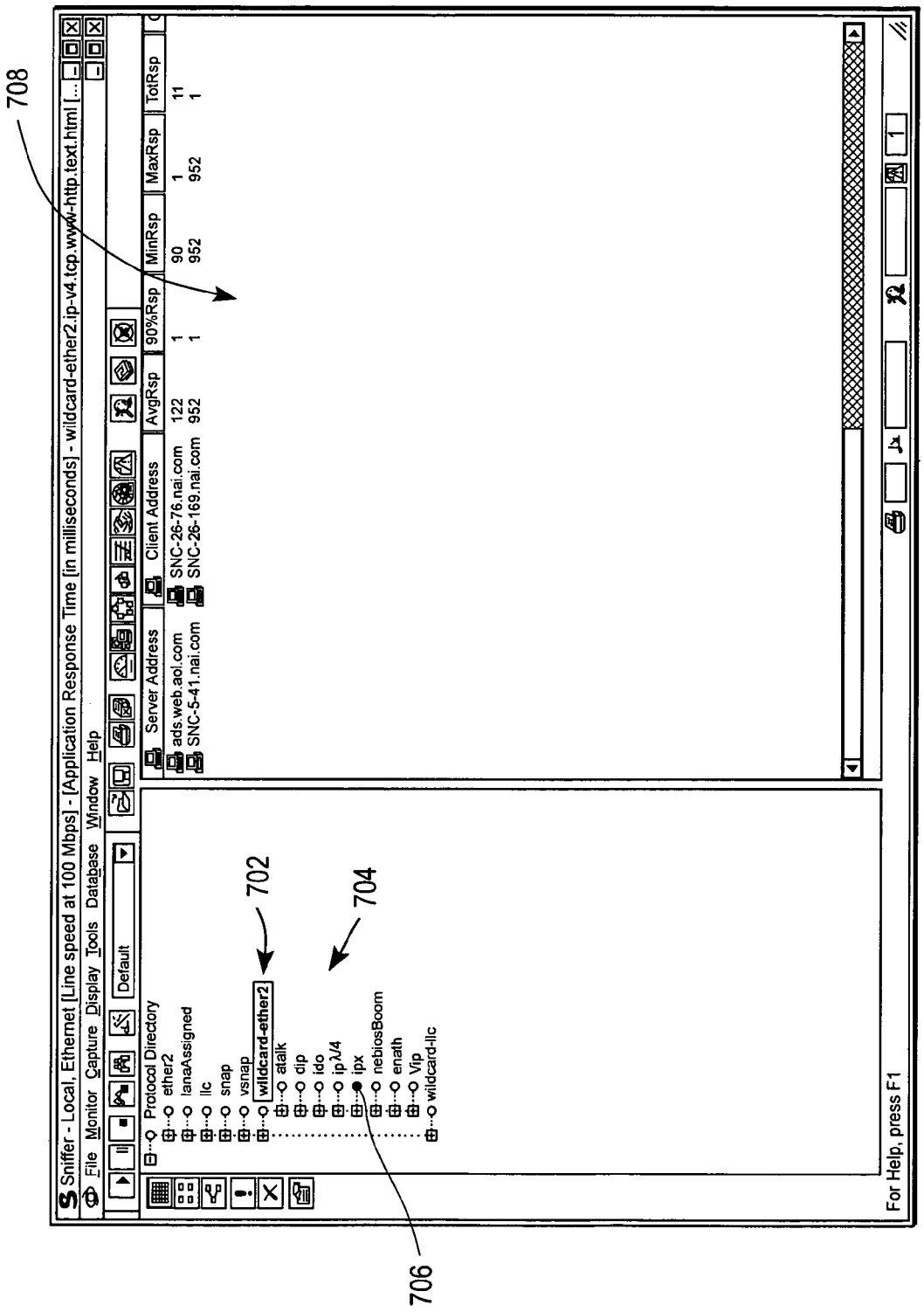
FIGS. 7-9 illustrate graphical user interfaces that display the information collected to monitor verb-specific application response times.
Figure 8:
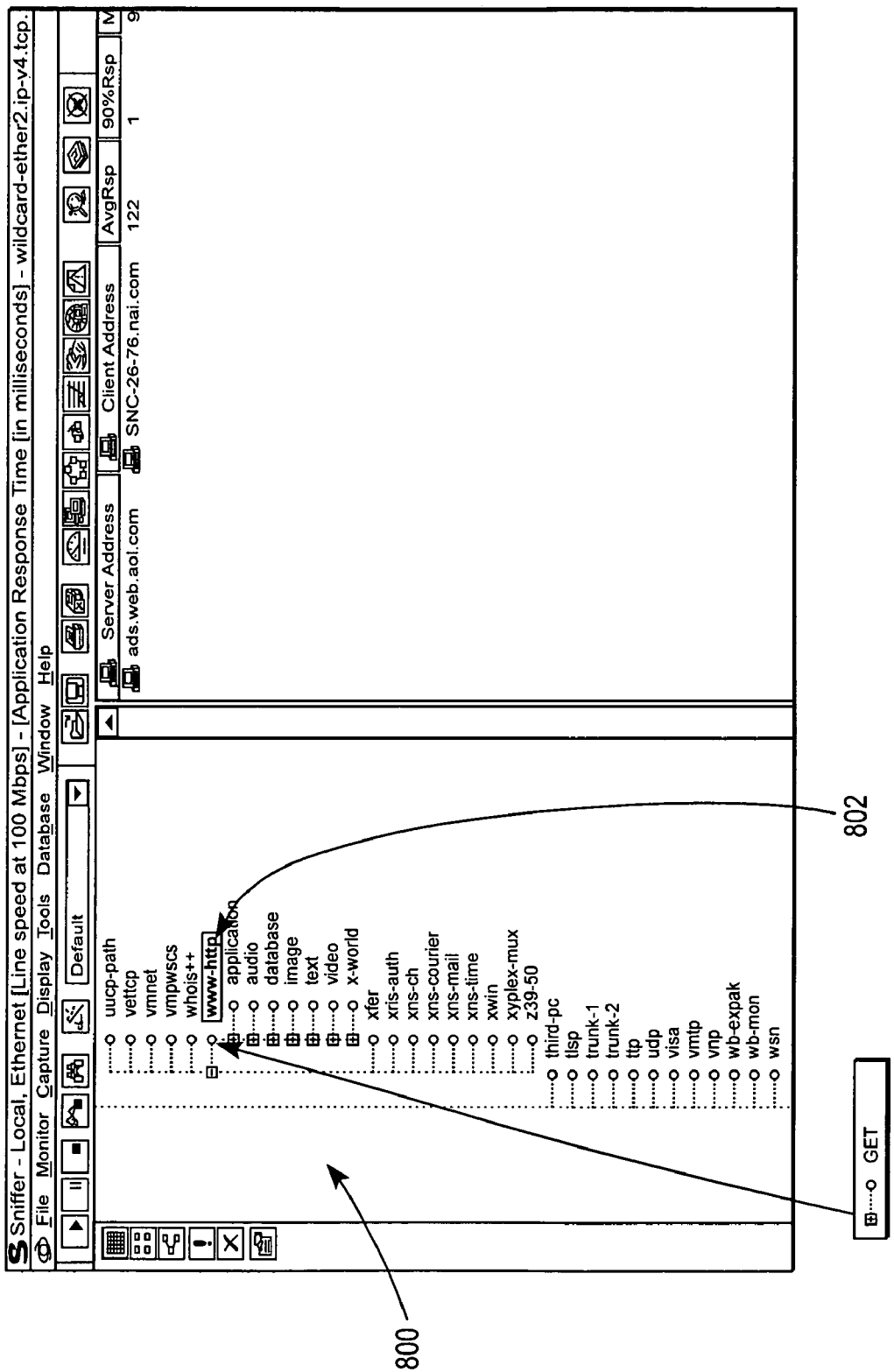
Figure 9:
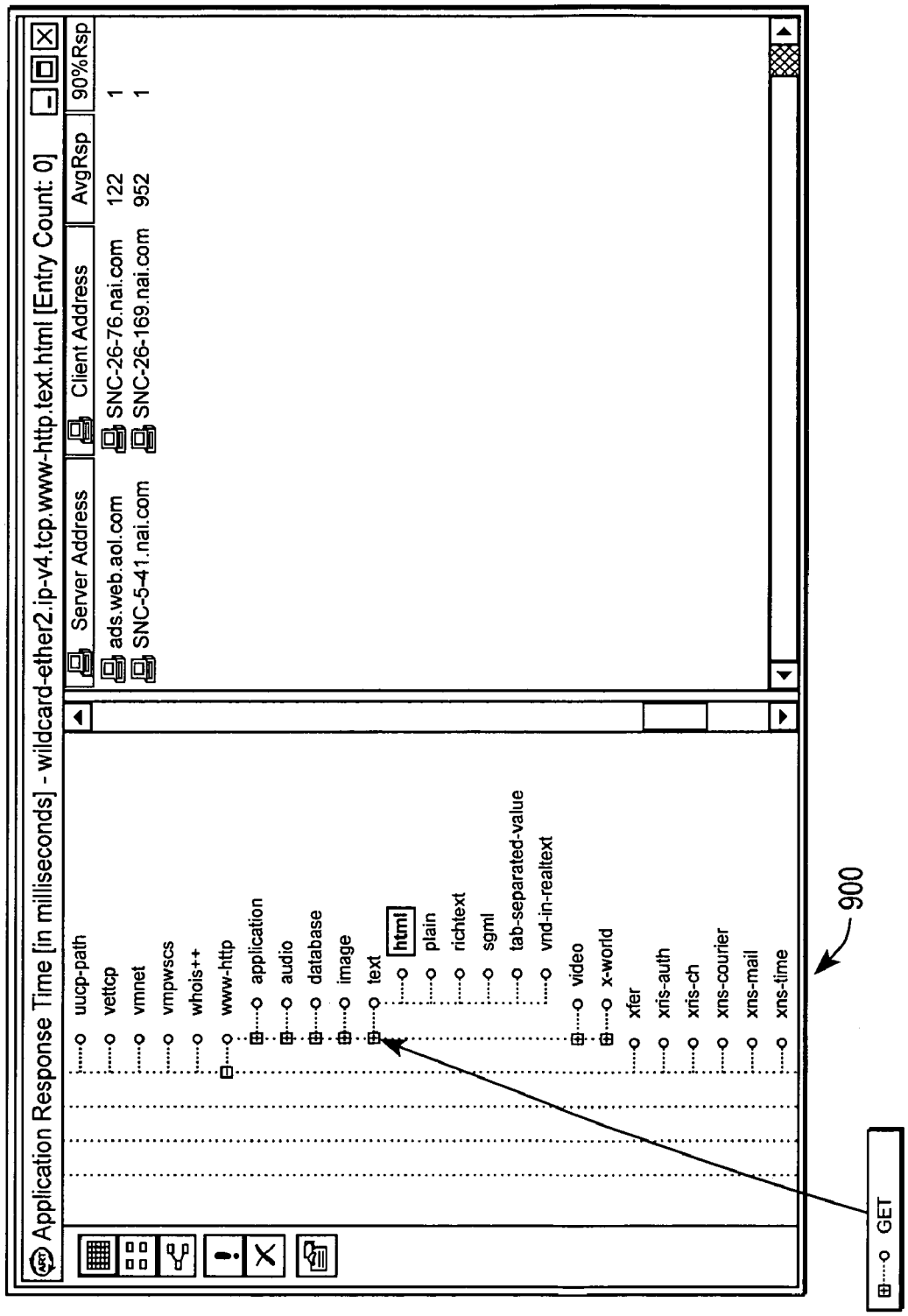

FIGS. 7-9 illustrate graphical user interfaces that display the information collected to monitor verb-specific application response times. FIG. 7 illustrates how an exemplary RMON ART protocol tree 700 looks, in accordance with one embodiment. As shown, each base protocol 702 is capable of expanding into a sub-tree 704. Green indicators 706 indicate that traffic is being seen on particular trees.

The graphical user interface of FIG. 7 further includes a right-hand side frame 708 in which information may be shown for the verb that is selected in the window in which the tree 700 resides. This information may include a server address, a client address, an average response time, and a plurality of "buckets." Each bucket reflects a category of packet data that meet predetermined response time criteria. Listed in each bucket is a number of packets that meet the associated criteria. Criteria may include, but is not limited to a response time minimum, a response time maximum, etc.

FIG. 8 illustrates an expanded wildcard-ether2-ip-v4 tree 800. A highlight 802 is on a "www-http" application. As indicated by the arrow, the response time for 'GET' (an application verb) for HTTP may be either in this tree 800 as one of the sub-trees (as shown here) or in the sub-protocol of the parent protocol, as shown in FIG. 9. FIG. 9 illustrates another way 900 to represent the foregoing as the sub-tree of one of the sub-protocols of the parent protocol. In either case, the data to be displayed is the same, as seen in the right-hand side frame. In use, this information may be shown for the verb that is selected for display. These are derived from the TransactionPM_Store using the formulae 650 of FIG. 6B.

Figure 10:
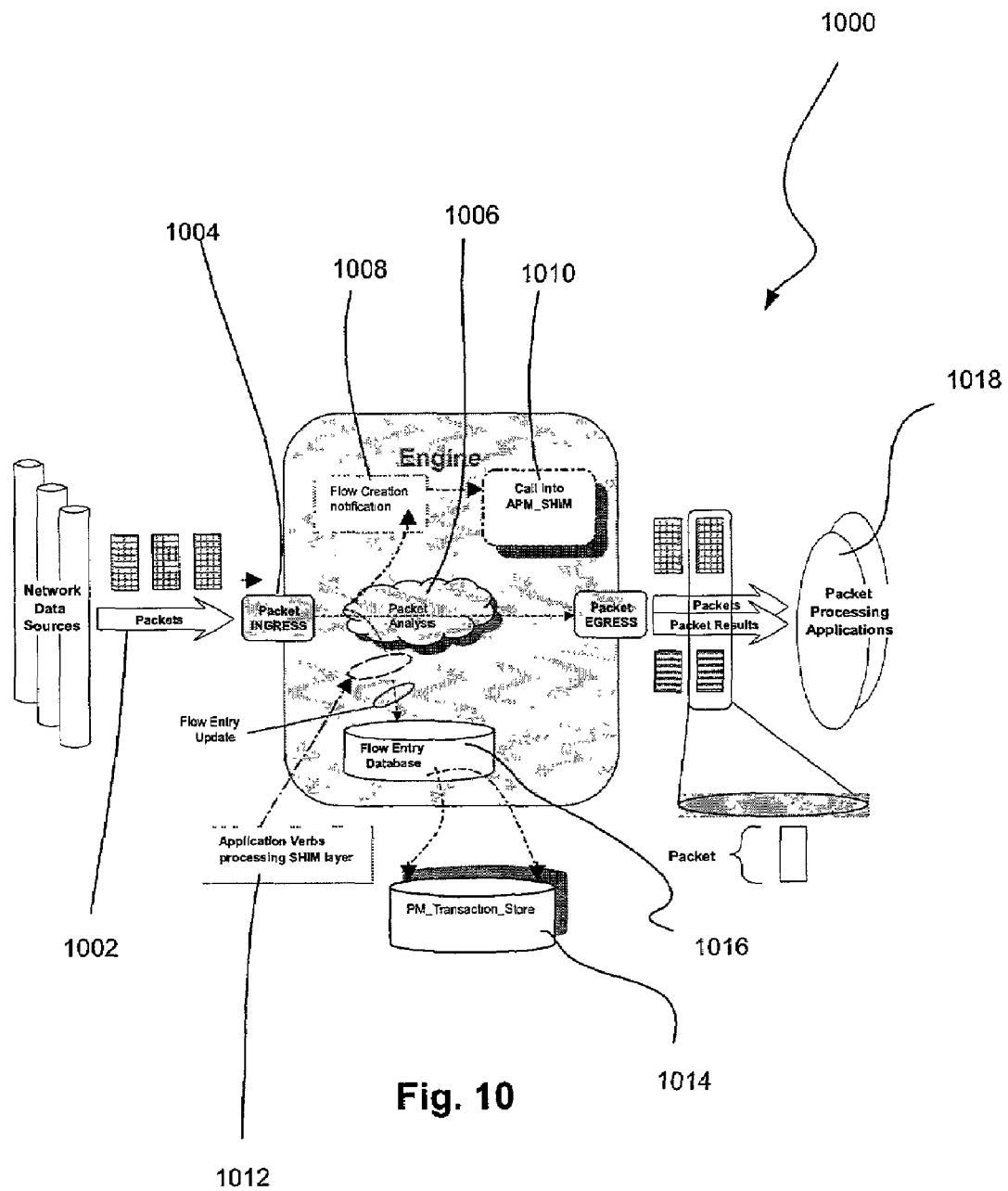
FIG. 10 illustrates an example of operation of one embodiment.

FIG. 10 illustrates an example 1000 of operation of the present embodiment. As shown, packets 1002 are received at a packet ingress 1004. Next, packet analysis 1006 is conducted after which a flow creation notification 1008 takes place upon the creation of a new flow. In response to such notification, a data structure is created and inserted via an application performance monitoring (APM) module 1010.

Further, existing flows are monitored for application verbs using the APM module 1010. Note operation 1012. Upon identification of application verbs, a data structure 1014 is populated and stored in a database 1016 for calculation of verb-specific response times. After the packet data is monitored in such a manner, the packet data is processed in a conventional manner utilizing packet processing applications 1018.

Appendix A illustrates exemplary pseudocode associated with one embodiment. FIG. 11 illustrates a timeline 1100 of events carried out by the pseudocode of Appendix A to calculate a verb-specific response time.

APPENDIX A

Pseudo Code:

The State Machine:

APM_State_Machine has::
    Last_Seen_Verb_Or_Transaction_ID
The Data Structure For Aggregation:

TransactionPM_store has ::
    Array_Of_Aggregation_Points_For_Verbs
    Protocol Identifier
    APM_State_Machine
TransactionPM_store::Array_Of_Aggregation_Points_For_Verbs
is indexed by State
Machine: :Last_Seen_Verb_Or_Transaction_ID. (This works on
the premise that each flow will see either HTTP verbs or
Oracle verbs, for example, and not both. In cases where a
flow may see more than one application verbs, these will
have to be grouped and given indices that are cumulative.
The following is the packet classification routine that
understands the application verbs / transaction ids.
packet_classification_routine ( )
{
    If application verb or transaction is identified
        update
        APM_State_Machine::Last_Seen_Verb_Or_Trans-
        action_ID, with the verb (depending upon
        application type) or transaction id in the
        packet - APM_SHIM.
}
The following routine computes non-verb/transaction
specific application performance measurements.
non_verb_specific_PM_computation ( )
{
    delta = response_time_that_is_computed;
    our_cache = delta;        // This is where we cache
                              the computed response
                              time measurement -
                              // APM_SHIM
}
The following routine is the entry point for every packet
that is seen by the classification engine.
the_engine_entry_point_for_packet ( )
{
    packet_classification_routine ( )    ----- (flow
creation notification)
    non_verb_specific_PM_computation ( );
    if our_cache and
APM_State_Machine::Last_Seen_Verb_Or_Transaction_ID have
valid values, then
        update
        TransactionPM_store::Array_Of_Aggrega-
        tion_Points_For_Verbs indexed by
        APM_State_Machine::Last_Seen_Verb_Or_Transaction_ID
}

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A method for calculating application verb response times, comprising:
    receiving a data packet containing data of an application protocol;

identifying an instance of an application verb in the data packet, the application verb being a transaction within the application protocol;

updating a state machine based on the instance of the application verb, the state machine comprising a current state of the application;

determining whether the instance of the application verb represents a completed response based on the updated state machine, a completed response being a response to a previous instance of the application verb with no further response to the previous instance of the application verb being expected; and responsive to determining that the instance of the application verb represents a completed response, calculating a response time associated with the application verb between the previous instance of the application verb and the instance of the application verb.

2. The method of claim 1, wherein determining whether the instance of the application verb represents a completed response based on the updated state machine further comprises checking for retransmissions, out-of-sequence packets, errors, and complications.

3. The method of claim 1, further comprising identifying a protocol identifier associated with the application protocol and determining a number of known application verbs associated with the protocol identifier.

4. The method of claim 3, further comprising allocating memory for a data structure based on the number of known application verbs associated with the protocol identifier.

5. The method of claim 1, wherein a current node of the state machine and a last seen application verb are stored as a bit vector.

6. The method of claim 1, wherein the calculated response time associated with the application verb is mapped to a RMON tree.

7. The method of claim 1, wherein calculating a response time associated with the application verb is performed in real-time.

8. A computer-readable medium having a computer program product for calculating application verb response times, comprising:

computer code for receiving a data packet containing data of an application protocol;

computer code for identifying an instance of an application verb in the data packet, the application verb being a transaction type within the application protocol;

computer code for updating a state machine based on the instance of the application verb, the state machine comprising a current state of the application;

computer code for determining whether the instance of the application verb represents a completed response based on the updated state machine, a completed response being a response to a previous instance of the application verb with no further response to the previous instance of the application verb being expected; and computer code for, responsive to determining that the instance of the application verb represents a completed response, calculating a response time associated with the application verb between the previous instance of the application verb and the instance of the application verb.

9. The computer-readable medium of claim 8, wherein computer code for determining whether the instance of the application verb represents a completed response based on the updated state machine further comprises computer code for checking for retransmissions, out-of-sequence packets, errors, and complications.

10. The computer-readable medium of claim 9, wherein the computer program product further comprises computer code for identifying a protocol identifier associated with the application protocol and computer code for determining a number of known application verbs associated with the protocol identifier.

11. The computer-readable medium of claim 10, wherein the computer program product further comprises computer code for allocating memory for a data structure based on the number of known application verbs associated with the protocol identifier.

12. The computer-readable medium of claim 8, wherein a current node of the state machine and a last seen application verb are stored as a bit vector.

13. The computer-readable medium of claim 8, wherein the calculated response time associated with the application verb is mapped to a RMON tree.

14. The computer-readable medium of claim 8, wherein calculating a response time associated with the application verb is performed in real-time.

15. A system for calculating application verb response times, comprising:

means for receiving a data packet containing data of an application protocol;

means for identifying an instance of an application verb in the data packet, the application verb being a transaction type within the application protocol;

means for updating a state machine based on the instance of the application verb, the state machine comprising a current state of the application;

means for determining whether the instance of the application verb represents a completed response based on the updated state machine, a completed response being a response to a previous instance of the application verb with no further response to the previous instance of the application verb being expected; and means for, responsive to determining that the instance of the application verb represents a completed response, calculating a response time associated with the application verb between the previous instance of the application verb and the instance of the application verb.

* * * * *

UNITED STATES PATENT AND TRADEMARK OFFICE
CERTIFICATE OF CORRECTION

PATENT NO.        : 7,433,947 B1
APPLICATION NO. : 10/039111
DATED             : October 7, 2008
INVENTOR(S)       : Venkatesh R. Iyer, Shilpa P. Bansod and Sanjeevan P. Raghavendran Page 1 of 1

It is certified that error appears in the above-identified patent and that said Letters Patent is hereby corrected as shown below:

Column 9, Line 2, in Claim 1, please add "type" after "transaction" and before "within"

Column 10, Line 12, in Claim 10, please change "claim 9" to "claim 8"

Signed and Sealed this

Seventeenth Day of February, 2009

JOHN DOLL
*Acting Director of the United States Patent and Trademark Office*